(12) United States Patent
Varenne

(10) Patent No.: US 7,404,461 B2
(45) Date of Patent: Jul. 29, 2008

(54) ELECTRICAL POWER TRAIN FOR A FUEL CELL VEHICLE, COMPRISING AN ELECTRICAL DISSIPATION ELEMENT

(75) Inventor: Pierre Varenne, Neyruz (CH)

(73) Assignees: Conception Et Developpement Michelin, S.A. (CH); Paul Scherrer Institut (CH)

( * ) Notice: Subject to any disclaimer, the term of this patent is extended or adjusted under 35 U.S.C. 154(b) by 419 days.

(21) Appl. No.: 11/111,257

(22) Filed: Apr. 20, 2005

(65) Prior Publication Data

US 2005/0241865 A1 Nov. 3, 2005

(30) Foreign Application Priority Data

Apr. 21, 2004 (FR) .................................. 04 04250

(51) Int. Cl.
*B60K 1/00* (2006.01)
(52) U.S. Cl. .................... 180/65.3; 180/65.1; 180/65.2; 180/65.5; 701/22
(58) Field of Classification Search ................ 180/65.1, 180/65.2, 65.3, 65.5; 429/26; 29/208; 219/202; 701/22
See application file for complete search history.

(56) References Cited

U.S. PATENT DOCUMENTS

| | | | | |
|---|---|---|---|---|
| 3,626,148 | A * | 12/1971 | Woytowich et al. | 219/208 |
| 3,976,507 | A | 8/1976 | Bloomfield | 429/17 |
| 5,058,391 | A * | 10/1991 | Periot | 62/238.6 |
| 5,346,778 | A | 9/1994 | Ewan et al. | 429/19 |
| 5,537,956 | A | 7/1996 | Rennfeld et al. | 123/41.29 |

(Continued)

FOREIGN PATENT DOCUMENTS

EP 0 633 157 A 1/1995

(Continued)

OTHER PUBLICATIONS

"Hybrid III", DISS.ETH No. 11672, 1996, p. 21 (with translation).

(Continued)

*Primary Examiner*—Christopher Ellis
*Assistant Examiner*—Cynthia F Collado
(74) *Attorney, Agent, or Firm*—Fitzpatrick, Cella, Harper & Scinto

(57) ABSTRACT

An electrical power train for a vehicle, the power train comprising an electrical line (61), a fuel cell (3) connected to the electrical line (61), an electrical energy management unit (6) comprising a module controlling the fuel cell, a control device available to the driver of the vehicle for controlling deceleration of the latter, the control device being connected to the management unit, at least one electrical machine (4) connected to at least one driving wheel (40) connected to the electrical line (61) by means of an electronic module controlling the electrical machine, the electrical machine (4) being connected to a second cooling circuit (2) in which a cooling liquid circulates, independent of the first cooling circuit (1), an electrical dissipation element (8), and means for ordering the control module of the fuel battery to stop the process of producing electrical energy while connecting the said dissipation element (8) to the electrical line (61), in the event of a deceleration demand and when the management unit (6) detects that the power absorbed by the loads is less than the power sent over the electrical line (61).

9 Claims, 1 Drawing Sheet

U.S. PATENT DOCUMENTS

| | | | |
|---|---|---|---|
| 6,087,744 A | 7/2000 | Glauning | 310/58 |
| 6,186,254 B1 * | 2/2001 | Mufford et al. | 180/65.3 |
| 6,347,528 B1 | 2/2002 | Iritani et al. | 62/324.6 |
| 6,448,535 B1 * | 9/2002 | Ap | 219/208 |
| 6,502,652 B2 * | 1/2003 | Rogg | 180/65.2 |
| 6,651,761 B1 | 11/2003 | Hrovat et al. | 180/65.3 |
| 6,743,539 B2 | 6/2004 | Clingerman et al. | 429/24 |
| 6,938,431 B2 | 9/2005 | Hanada | 62/201 |
| 7,048,044 B2 | 5/2006 | Ban et al. | 165/202 |
| 7,096,985 B2 * | 8/2006 | Charaudeau et al. | 180/65.2 |
| 7,293,621 B2 * | 11/2007 | Long | 180/165 |
| 2002/0027027 A1 | 3/2002 | Skala | 180/65.2 |
| 2003/0001440 A1 | 1/2003 | Bourqui et al. | 310/43 |
| 2003/0133267 A1 | 7/2003 | Beihoff et al. | 361/704 |
| 2004/0086759 A1 * | 5/2004 | Parchamazad | 429/26 |
| 2005/0241865 A1 * | 11/2005 | Varenne | 180/65.1 |

FOREIGN PATENT DOCUMENTS

| | | |
|---|---|---|
| EP | 1 321 330 A2 | 6/2003 |
| JP | 2004104925 | 4/2004 |
| WO | WO96/41393 | 12/1996 |

OTHER PUBLICATIONS

"Hybrid III", DISS.ETH No. 11784, 1996, pp. 30, 31, 60 and 61 (with translation).

* cited by examiner

ELECTRICAL POWER TRAIN FOR A FUEL CELL VEHICLE, COMPRISING AN ELECTRICAL DISSIPATION ELEMENT

CROSS-REFERENCE TO RELATED APPLICATIONS

This application claims the benefit of French Patent Application No. 04/04250, filed Apr. 21, 2004, which is incorporated herein by reference in its entirety.

BACKGROUND OF THE INVENTION

Field of the Invention

The present invention relates to motor vehicles with a fuel cell. More particularly, the present invention relates to the management of the electrical energy in certain transient phases.

It is well known that one of the possibilities for producing electrical energy on board a vehicle is to use a fuel cell. Unfortunately, certain transient phases, in particular when it is desirable to brake the vehicle abruptly, may be fairly problematic since it is difficult to abruptly cancel out the power produced by the fuel cells. This is more particularly the case when the fuel cell is supplied with oxygen by compressing the ambient air in real time at the time of use, instead of being supplied directly with pure oxygen. In certain configurations, and in particular the last one cited, it has been observed that the reaction of a fuel cell to changes in power is not very dynamic, much less dynamic than an internal combustion engine.

This is true both when the power requirement increases and when the power requirement decreases. In certain cases, for example, when the vehicle driver wishes to slow down abruptly, after demanding full acceleration, just prior to that, the electrical power absorbed by a fuel cell vehicle may drop very abruptly, much more rapidly than the power produced by the battery. However, it may happen that storing electrical energy is impossible, for example, because there is no electrical accumulator, or because if the vehicle is provided with a battery of accumulators, these are already at their maximum charge.

Moreover, it is well known that electrical machines are reversible. Thus, in an electrical traction motor vehicle, the electrical machine coupled mechanically to the driving wheels can be used as an electric motor to provide the propulsion of the vehicle, supplying electrical energy to the electrical machine. The latter can be used also as an electrical generator during the vehicle braking phases and in this case it converts the mechanical braking energy into electrical energy that the vehicle must absorb, possibly by thermal dissipation. This operating mode is often referred to as "electrical braking."

Though a common-sense objective is to recover the energy, as much as possible during braking of the vehicle, it is known that this recovery comes up against the characteristics of the electrical energy storage devices currently known. If the electrical machine is made to function as a generator at the maximum torque of which it is capable, a very intense current will be sent over the electrical line. However, the majority of batteries are not capable of absorbing high charging currents. Only capacitors can absorb charging currents as high as discharge currents, but their storage capacity remains low. The technology of supercapacitors may prove to be advantageous for automobile applications by offering a storage capacity per unit mass (that is to say an energy density) which is greater than capacitors and allows higher charging currents than batteries. Despite everything, installing accumulators always gives rise to an increase in weight proportional to their storage capacity, for the same technology. In addition, whatever the technology used for storing the electrical energy, the impossibility of continuing the accumulation of electrical energy when the charging state of the devices used is at its maximum is always encountered.

However, it is advantageous to be able, despite everything, to continue to use the electrical machine or machines as a generator in order to provide the deceleration or braking of the vehicle, if only to alleviate the stress on the mechanical brakes of the vehicle. It is in fact advantageous to use these only in emergency maneuvers or for greater braking in order to avoid significant overheating in normal use. In addition, electrical braking affords ease of driving comparable to the sensations afforded in a conventional vehicle by the engine brake, which is of such a nature as to facilitate taking control of such vehicles by drivers whose reflexes have been forged by driving these conventional vehicles.

For all the reasons mentioned above, it is useful to be able to maintain electrical braking whilst the fuel cell continues momentarily to produce electrical energy.

The patent application WO96/41393 describes a fuel cell for a vehicle in which an electrical element is immersed in the liquid of the fuel cell cooling circuit in order to be able to heat the fuel cell very quickly. The electrical element can where necessary be supplied with electrical current whilst producing electrical energy during the braking of the vehicle in order to accelerate the heating of the battery or to maintain its temperature. U.S. Pat. No. 6,448,535 also describes a fuel cell for a vehicle in which an electrical element is immersed in the liquid of a primary cooling circuit of the fuel cell in order to be able to prevent the liquid freezing, since this is according to this patent, necessarily de-ionized water. This primary cooling circuit is connected thermally to a secondary cooling circuit by liquid with which it exchanges its heat. The secondary cooling circuit is alone provided with a radiator for exchange with the atmosphere and is also used for cooling an electric motor.

U.S. Pat. No. 6,448,535 proposes to use a liquid-cooled electric traction motor, where the liquid in this case exchanges its heat in the cooling circuit with a heat-transfer liquid located on the vehicle. If heat were also dissipated in the cooling circuit by means of the electrical element immersed in the cooling circuit, it could possibly result in excessive heating.

The effective management of certain vehicle braking phases, in particular the case of heavy and abrupt braking is a problem that needs to be addressed.

BRIEF DESCRIPTION OF THE INVENTION

The objective of the invention is to afford a solution for the management of power, which is well suited for dealing in all circumstances with the abrupt braking phases of a fuel cell vehicle.

The invention proposes an electrical power train for a vehicle, the power train comprising an electrical line, a fuel cell connected to the electrical line, an electrical energy management unit comprising a fuel cell control module, a control device available to the driver of the vehicle in order to control deceleration of the latter, the control unit being connected to the management unit, at least one electrical machine connected to at least one driving wheel connected to the electrical line by means of an electronic module controlling the electrical machine, the electrical machine being connected to a second cooling circuit in which a cooling liquid circulates independent of the first cooling circuit, and an electrical dissipation element means for, in the event of demand for deceleration, and when the management unit detects that the power absorbed by the loads is less than the power sent over the electrical line, ordering the fuel cell control module to stop the electrical energy production process whilst connecting the dissipation element to the electrical line.

Thus the invention proposes to dissipate in an electrical element the excess electrical energy produced both by one or more electrical traction machines controlled so as to produce electrical braking and by the fuel cell for a certain time due to its operating inertia.

Preferably, in order to ensure very effective dissipation, use is made of an electrical element immersed in a liquid of a heat-transfer liquid cooling circuit.

In addition, having observed that, in the case of electrical braking, the fuel cell will very quickly no longer be drawn on, the invention preferably provides two separate cooling circuits: a first cooling-liquid cooling circuit which provides the cooling of the fuel cell and a second cooling-liquid cooling circuit, independent of the first one mentioned, which concerns the electrical machine or machines connected to the driving wheels and the electronic control modules, in particular those controlling these electrical machines, and the electrical dissipation elements immersed in the first cooling circuit.

Since the fuel cell will no longer be drawn on during the electrical braking phases, the cooling capacity of the cooling circuit of this part of the vehicle will very quickly also no longer be drawn on, beyond the effects of the inertia of the fuel cell. It will therefore be understood that the best location for the electrical element for dissipating the electrical braking energy is in the particular cooling circuit, which concerns the fuel cell. This is because, with regard to the electrical machine connected to the vehicle driving wheels, whether functioning in traction or in braking, this electrical machine is able to be called on to the maximum of its capacities, as well as all the control devices for it. However, the efficiency is substantially the same whatever the direction of energy conversion (electrical energy into kinetic energy, or vice versa). The losses responsible for a release of heat are therefore always substantially the same.

Using the cooling circuit of the electrical machine or machines coupled mechanically to the wheels in order in addition to cool the electrical dissipation element amounts to calling all the more on this cooling circuit and having to size it accordingly. This constraint is dispensed with by installing the electrical dissipation element in the cooling circuit of the fuel cell since, during the electrical braking phases, this circuit is called on only for a small amount of time, a function of the inertia of the fuel cell. The cooling capacity of this cooling circuit is therefore available for discharging the heat produced by the electrical dissipation element.

It is judicious to provide two separate cooling circuits for another reason: the temperature levels of the circuits may be different. There will be an advantage in working at approximately 90° C., for example, for the cooling circuit of a thermal engine, or 70° C. to 80° C., for example, for the cooling circuit of a fuel cell and at a temperature of 50° C., for example, or even less if possible, on the cooling circuit of the electrical machines and associated control devices.

DESCRIPTION OF THE BEST EMBODIMENT OF THE INVENTION

Figure 1:
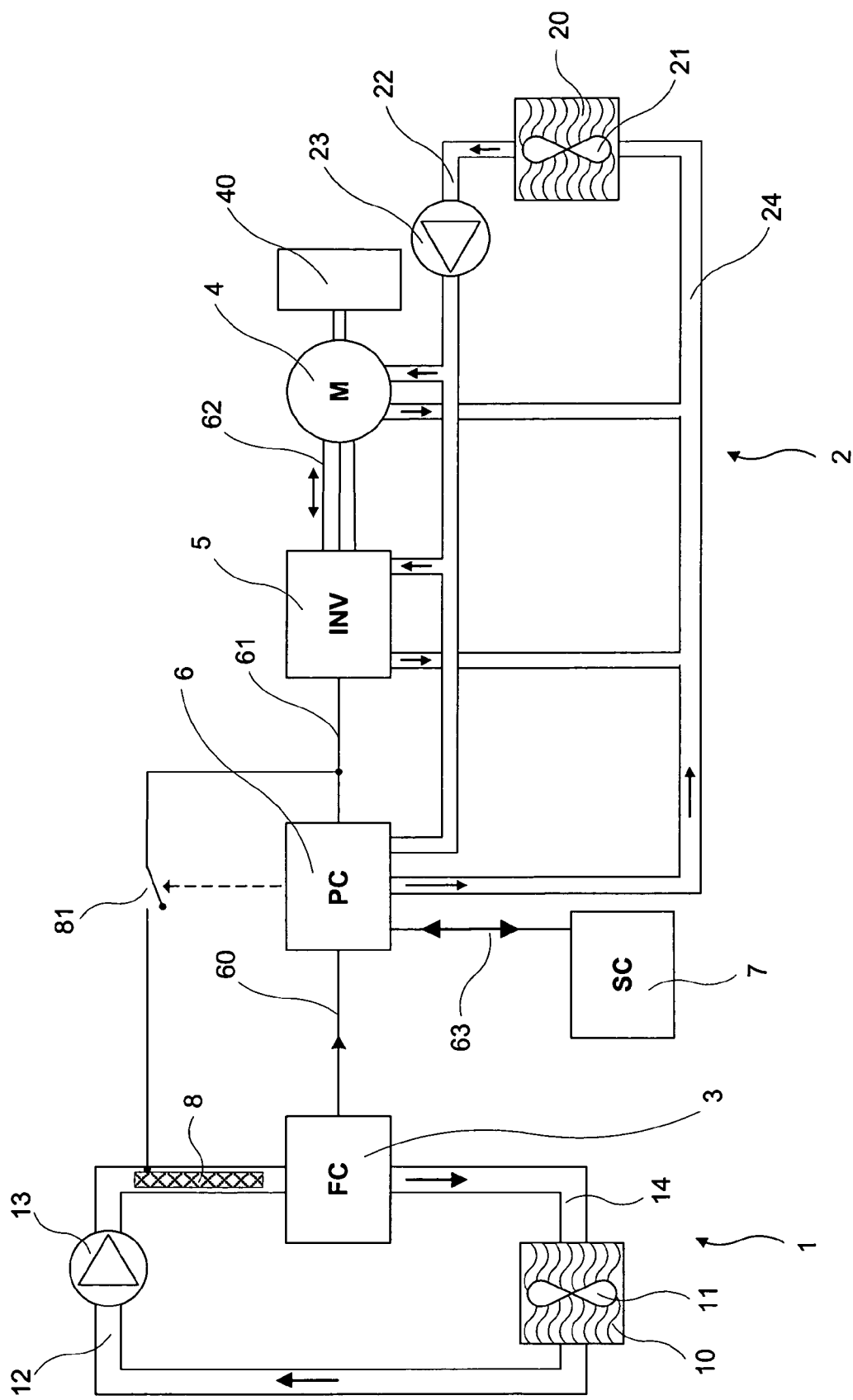
FIG. 1 depicts an exemplary embodiment of a cooling circuit(s) of the invention.

In FIG. 1, a fuel cell 3 is connected to an electrical energy management unit 6 by an electrical line 60. The fuel cell is preferably a polymer membrane cell (PEFC) or an alkaline cell (AFC). An electrical machine 4 is intended to be used as a traction motor or as a generator during the electrical braking phases. The electrical machine 4 is connected to at least one driving wheel 40. The electronic control module for the electrical machine is an inverter 5. An electrical line 61 connects the electrical energy management unit 6 to the inverter 5, and an electrical line 62 connects the inverter 5 to the electrical machine 4. Naturally, other electrical loads (not shown in the FIG. 1) are connected to the line 61, such as for example, the vehicle air conditioner, numerous peripheral functions such as the vehicle lighting, or other main functions whose control, formerly essentially by mechanical method, is switching to electrical control, such as steering, brakes or even the vehicle suspension.

The power train according to the invention preferably comprises an electrical energy storage device connected to the electrical line 61 via the electrical energy management unit 6, and connected to the electrical energy management unit 6 by means of an electrical line 63. This electrical energy storage device is advantageously a bench of supercapacitors 7.

A first cooling circuit 1, in which a first cooling liquid charge circulates, provides the cooling of the fuel cell 3. The first cooling circuit 1 comprises a first radiator 10 for dissipating heat to the ambient atmosphere, a hydraulic pump 13, and a pipe 12 providing the distribution of the cooling liquid from the first radiator 10 to the fuel cell 3. The cooling liquid may be a de-ionized liquid in order not to be electrically conductive, for example, water or a mixture of de-ionized water and de-ionized glycol, since it circulates within the fuel cell itself (according to the importance of this electrical aspect, that is to say if it is important to increase the electrical impedance of the arm consisting of this cooling circuit). The direction of circulation of the heat-transfer liquid is indicated in the drawing. Pipe 14 is shown returning the cooling liquid after it is heated from the cell 3 to the first radiator 10, providing heat exchange with the ambient air. As is well known, the cooling of the radiator 10 is made more effective by the action of a fan 11 providing a forced circulation of the ambient air through the radiator 10.

A second cooling circuit 2 is also shown, independent of the first cooling circuit 1, and in which a cooling liquid circulates. The second cooling circuit 2 uses another heat-transfer liquid charge independent of the first charge used in the first cooling circuit. It is possible if necessary to use in the two cooling circuits a heat-transfer liquid with the same properties. In any case the charges are separate and therefore the liquids do not mix. The second cooling circuit is also thermally independent of the first cooling circuit 1. The second cooling circuit comprises a second radiator 20 for dissipating heat to the ambient atmosphere, different from the first radiator 10, a hydraulic pump 23 and a system of pipes providing the distribution of the cooling liquid to the various components which it has to cool. The direction of circulation of the heat-transfer liquid is indicated on the drawing. The second cooling circuit 2 establishes a circulation of cooling liquid in several electrical components. The cooling liquid is, for example, ordinary water or a mixture of water and glycol.

The power train, or more generally the vehicle propelled by the power train according to the invention, could possibly comprise various electronic management modules other than the inverter 5 already mentioned, the second cooling circuit 2 establishing a circulation of cooling liquid in several electronic management modules. Preferably, all the electronic management modules cooled by means of a cooling liquid are connected to the second cooling circuit 2.

Preferably, all the electrical components cooled by means of a cooling liquid are connected to this second cooling circuit 2. Advantageously, the electrical machine 4 mechanically connected to the driving wheel or wheels 40 of the vehicle is connected to this second cooling circuit 2.

Thus a network of pipes 22 can be seen providing the distribution of cooling liquid at low temperature to the electrical machine 4, to the inverter 5 and to the electrical energy management unit 6. There can also be seen a network of pipes 24 returning the cooling liquid after its heating from the electrical energy management unit 6, from the inverter 5 and from the electrical machine 4 to the second radiator 20. As is well known per se, the efficiency of the heat exchange of the second radiator 20 is reinforced by the action of a fan 21 providing a forced circulation of ambient air through the second radiator 20.

Advantageously, all the electrical components cooled by means of a cooling liquid are connected to the second cooling circuit 2.

An electrical dissipation element 8 is installed in the first cooling circuit 1. This dissipation element 8 is connected to the electrical line 61 via an electronic switch 81, itself controlled by the electrical energy management unit 6.

The electrical energy management unit 6 receives information coming from the vehicle driver and information describing the state of functioning of the vehicle, such as the speed of movement. In the electrical traction phase, the electrical energy management unit 6 directly connects the fuel cell 3 to the inverter 5 and the inverter 5 transmits the electrical energy in suitable form to the electrical machine 4 so that the latter functions as a motor. According to circumstances, the electrical energy management unit 6 can also connect the bench of supercapacitors 7 to the electrical line 61 during the phases of operating as a motor in order to draw on the electrical energy in reserve in the bench of supercapacitors 7 in order to add it to the energy coming from the fuel cell 3.

Each of the two cooling circuits is preferably regulated for temperature, for example by means of a thermostat, not shown in FIG. 1. Since the circuits are independent, the regulation temperature for each cooling circuit may be different. For example, the ideal regulation temperature for a fuel cell is a little higher than the ideal regulation temperature of a circuit providing the cooling of the electrical machine 4 and the electrical components which are associated with it. By way of illustration, the regulation temperature is around 60° C. to 90° C. for a polymer membrane cell (PEFC) and is around 45° C. to 65° C. for the circuit providing the cooling of the electrical machine 4 and the electronic components which are associated with it.

When the operating mode of the vehicle controlled by the electrical energy management unit 6 goes into electrical braking, the inverter 5 controls the electrical machine 4 as a generator so that it returns electrical energy over the line 61. If the electrical energy thus returned over the line 61 is greater than the requirements of the vehicle, that is than the energy absorbed by the other electrical loads connected to the line 61 such as those mentioned above, then the control of the fuel cell 3 stops the functioning of the latter. As the inertia of a fuel cell is very low, the fuel cell 3 rapidly ceases to communicate heat to the cooling liquid circulating in the first cooling circuit 1. During functioning as electrical braking, all the electrical loads connected to the line 61 will absorb some of the electrical energy available. Equally, the electrical energy management unit 6 sends the electrical energy as a priority to the bench of supercapacitors 7, provided that these have not reached their maximum charge.

However, if all these loads do not make it possible to absorb the electrical energy available on the line, which the electrical energy management 6 can detect for example by a rise in voltage on the line 61, then the electrical energy management unit 6 closes the switch 81 in order to add the dissipation element 8 as an electrical load. This element is capable of absorbing the maximum current injected on the line 61 by the electrical machine or machines 4. The electrical dissipation element 8 heats up and the heat is discharged gradually by the cooling liquid, which takes it to the first radiator 10. Naturally the installation is sized so that, even when the electrical dissipation element 8 has the maximum possible current running through it, the heating of the cooling liquid within the cooling circuit 1 remains compatible with the correct functioning of the fuel cell 3.

The efficiency of the discharge of the heat produced by the dissipation element 8 is such that, by comparison with a dissipation element which is cooled by air, it is possible to use much more compact elements 8. In addition, there is no degradation of the coefficient of penetration in the air of the vehicle. This is because the capacity of the radiator 10 is used to discharge heat at a time when it would not have been used because of the stoppage of the functioning of the fuel cell. Thus it has been possible to arrange the cooling circuits so as to use their capacities to the best possible extent and profiting from the mutually exclusive character of the functioning of the fuel cell at its maximum charge and the use of the dissipation element 8 at its maximum load.

What is claimed is:

1. An electrical power train for a vehicle, the power train comprising:
   an electrical line to which the auxiliary loads are connected;
   a fuel cell connected to the electrical line, a first cooling circuit, providing the cooling of the fuel cell by means of a first heat-transfer liquid charge, the first cooling circuit comprising a first radiator for dissipating heat to the ambient atmosphere;
   an electrical energy management unit comprising a fuel cell control module;
   a control device available to the driver of the vehicle in order to control deceleration of the vehicle, the control device being connected to the management unit;
   at least one electrical machine connected to at least one driving wheel connected to the electrical line by means of an electronic control module for the electrical machine;
   an electrical dissipation element; and
   means for ordering the fuel cell control module to stop the process of producing electrical energy while connecting the dissipation element to the electrical line, in the case of a demand for deceleration and when the management unit detects that the power absorbed by the auxiliary loads is less than the power sent over the electrical line.

2. The power train according to claim 1, wherein the electrical machine is connected to a second cooling circuit which comprises a second radiator for dissipating heat to the ambient atmosphere, the second cooling circuit using another heat-transfer liquid charge independent of the charge used in a first cooling circuit, the second cooling circuit also being thermally independent of the first cooling circuit.

3. The power train according to claim 1, wherein the electrical dissipation element is immersed in the first cooling circuit.

4. The power train according to claim 1, wherein the fuel cell is supplied with oxygen by compression of ambient air.

5. The power train according to claim 1, wherein the fuel cell is supplied with pure oxygen.

6. The power train according to claim 1, wherein the fuel cell is selected from the group consisting of polymer membrane cells and alkaline cells.

7. The power train according to claim 1, wherein the electronic control module for the electrical machine is an inverter.

8. The power train according to claim 1, comprising various electronic management modules, wherein the second cooling circuit establishes a circulation of cooling liquid in several electronic management modules.

9. The power train according to claim 1, wherein an electrical energy storage device is connected to the electrical line via the electrical energy management unit.

* * * * *

UNITED STATES PATENT AND TRADEMARK OFFICE
CERTIFICATE OF CORRECTION

PATENT NO. : 7,404,461 B2  Page 1 of 1
APPLICATION NO. : 11/111257
DATED : July 29, 2008
INVENTOR(S) : Pierre Varenne It is certified that error appears in the above-identified patent and that said Letters Patent is hereby corrected as shown below:

COLUMN 2:

Line 34, "freezing, since this" should read --from freezing, since the liquid--; and
Line 54, "afford" should read --provide--.

COLUMN 3:

Line 2, "independent" should read --independently--;
Line 45, "in" (second occurrence) should read --to--; and
Line 46, "addition to" should read --additionally--
and "element" should read --element,--.

Signed and Sealed this

Sixteenth Day of December, 2008

JON W. DUDAS
*Director of the United States Patent and Trademark Office*